M. E. WIDELL.
SOLDERING MACHINE.
APPLICATION FILED AUG. 3, 1916.

1,338,716.

Patented May 4, 1920.
5 SHEETS—SHEET 1.

Witnesses.
J C Carpenter
Thos. J. O'Brien

Inventor:
Magnus E. Widell
By Munday Evarts Adcock & Clarke
attys.

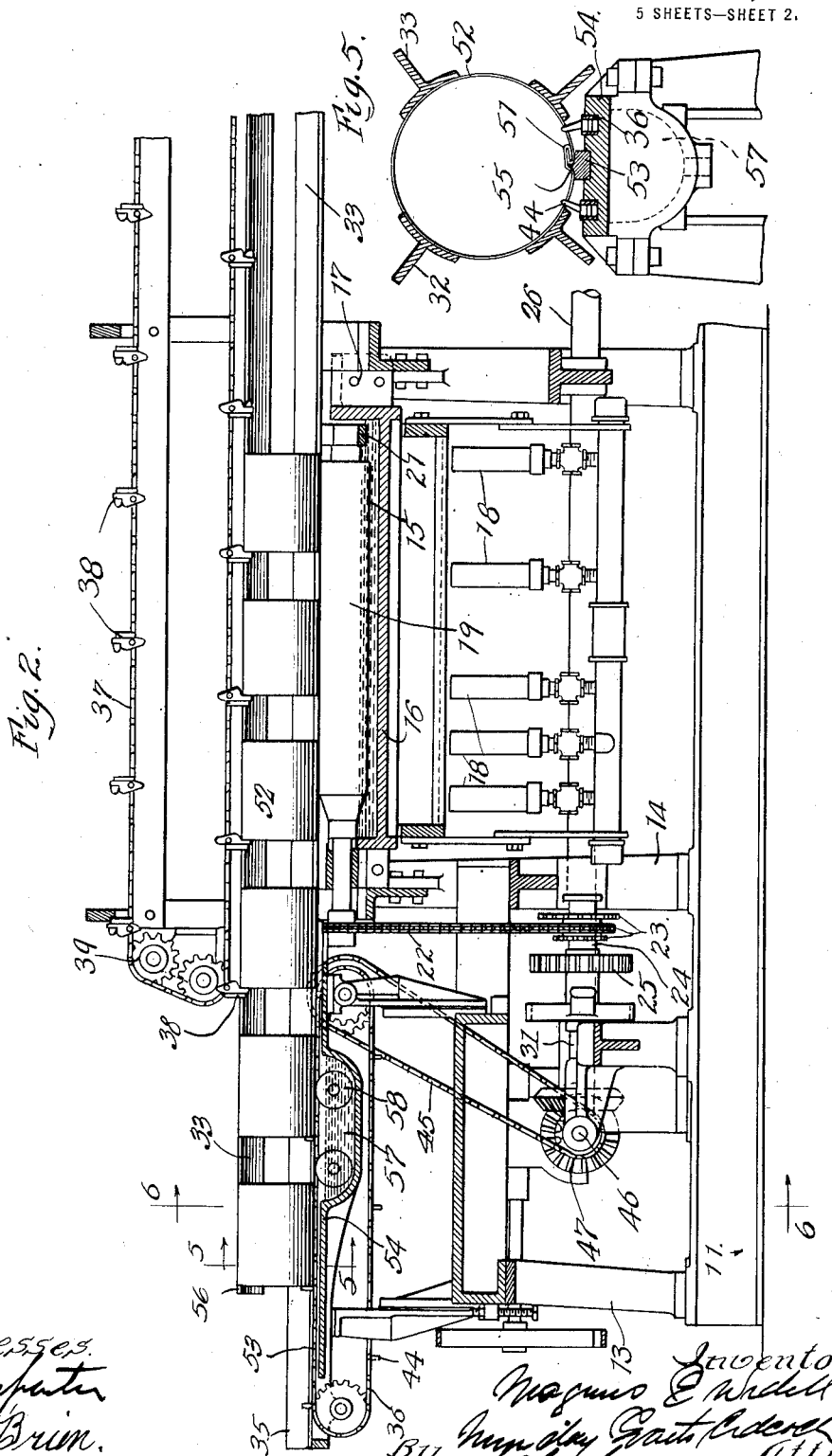

M. E. WIDELL.
SOLDERING MACHINE.
APPLICATION FILED AUG. 3, 1916.
1,338,716.
Patented May 4, 1920.
5 SHEETS—SHEET 3.
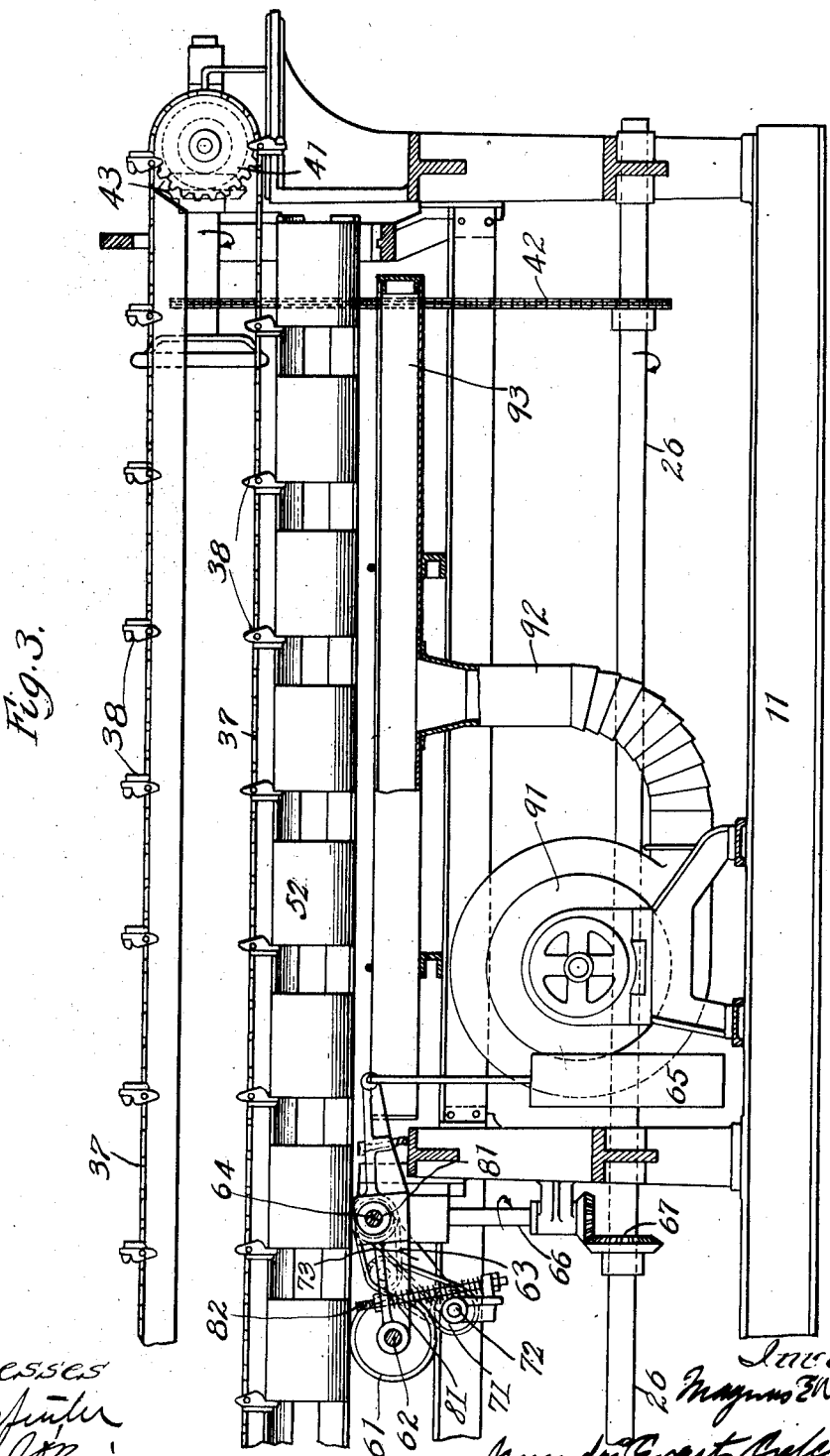

M. E. WIDELL.
SOLDERING MACHINE.
APPLICATION FILED AUG. 3, 1916.
1,338,716.
Patented May 4, 1920.
5 SHEETS—SHEET 4.
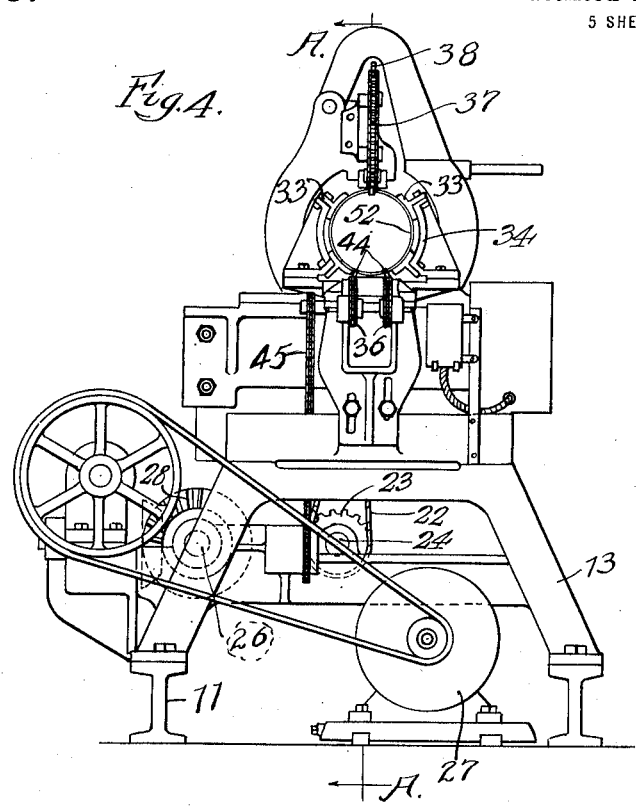
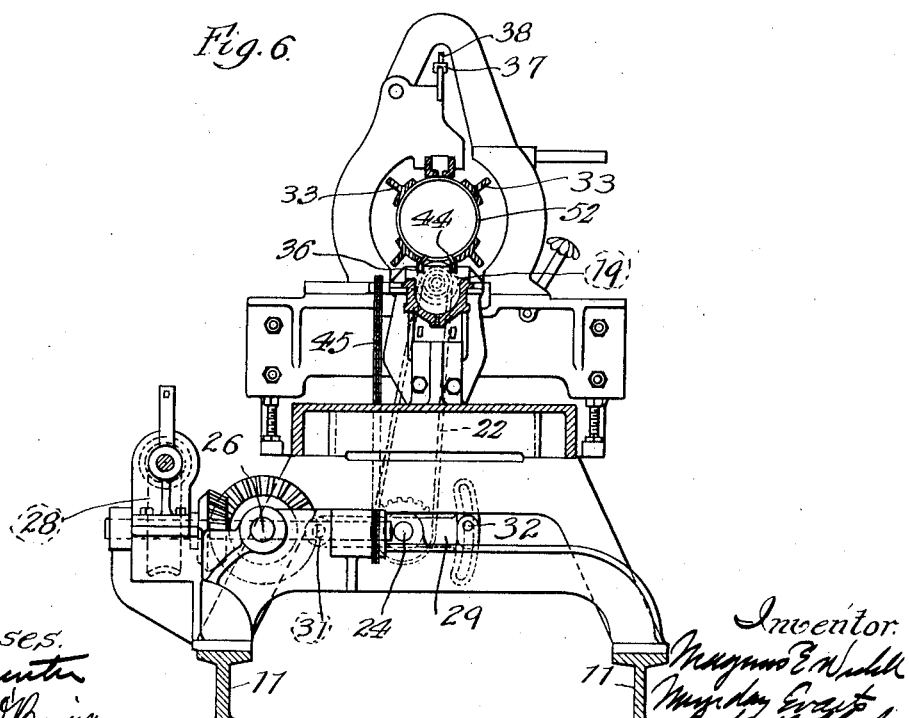

M. E. WIDELL.
SOLDERING MACHINE.
APPLICATION FILED AUG. 3, 1916.

1,338,716.

Patented May 4, 1920.
5 SHEETS—SHEET 5.

Witnesses
Inventor

UNITED STATES PATENT OFFICE.

MAGNUS E. WIDELL, OF MAYWOOD, ILLINOIS, ASSIGNOR TO AMERICAN CAN COMPANY, OF NEW YORK, N. Y., A CORPORATION OF NEW JERSEY.

SOLDERING-MACHINE.

1,338,716.

Specification of Letters Patent.　　Patented May 4, 1920.

Application filed August 3, 1916. Serial No. 112,903.

*To all whom it may concern:*

Be it known that I, MAGNUS E. WIDELL, a citizen of the United States, residing in Maywood, in the county of Cook and State of Illinois, have invented a new and useful Improvement in Soldering - Machines, of which the following is a specification.

This invention relates in general to soldering machines and has more particular reference to solder applying machines provided for applying solder to the side seams of bodies of cans and other metal containers.

In machines of this character it is frequently the custom to employ an elongated solder applying roll which turns in a bath of molten solder and is disposed with its axis parallel of the axis of travel of the can. Such a roll of course has a tendency to cause a rotation of the can bodies under its influence, which tendency must be overcome through the provision of means for preventing such rotation of the can bodies. It is particularly desirable that the side seam be accurately positioned before the body comes under the influence of the means provided to prevent rotation during soldering and it is a principal object of this invention to provide means for accomplishing this result which will be of easy and certain operation and which will not require the addition of complicated or delicate parts.

A further object of the invention is the provision of means for accurately positioning can bodies when the same are first fed in the soldering machine.

A further object of the present invention is the improvement of the means for removing excess solder from the side seam after it has passed the soldering devices, provision being made to prevent accumulation of the excess solder thus removed upon the parts which remove it from the side seam.

Other objects and advantages of the invention will be apparent as it is better understood from the following description when considered in connection with the accompanying drawing illustrating a preferred embodiment thereof.

Referring to the drawing,

Figure 1 is a side elevation of a soldering machine embodying my present invention;

Figs. 2 and 3 together constitute an enlarged section taken on the line A—A of Fig. 4, it being understood that Figs. 2 and 3 placed end to end will together constitute this section;

Fig. 4 is an end elevation of such machine taken from the left of Fig. 1;

Fig. 5 is an enlarged section on the line 5—5 of Fig. 2;

Fig. 6 is a section taken on the line 6—6 of Fig. 2;

Figure 1:
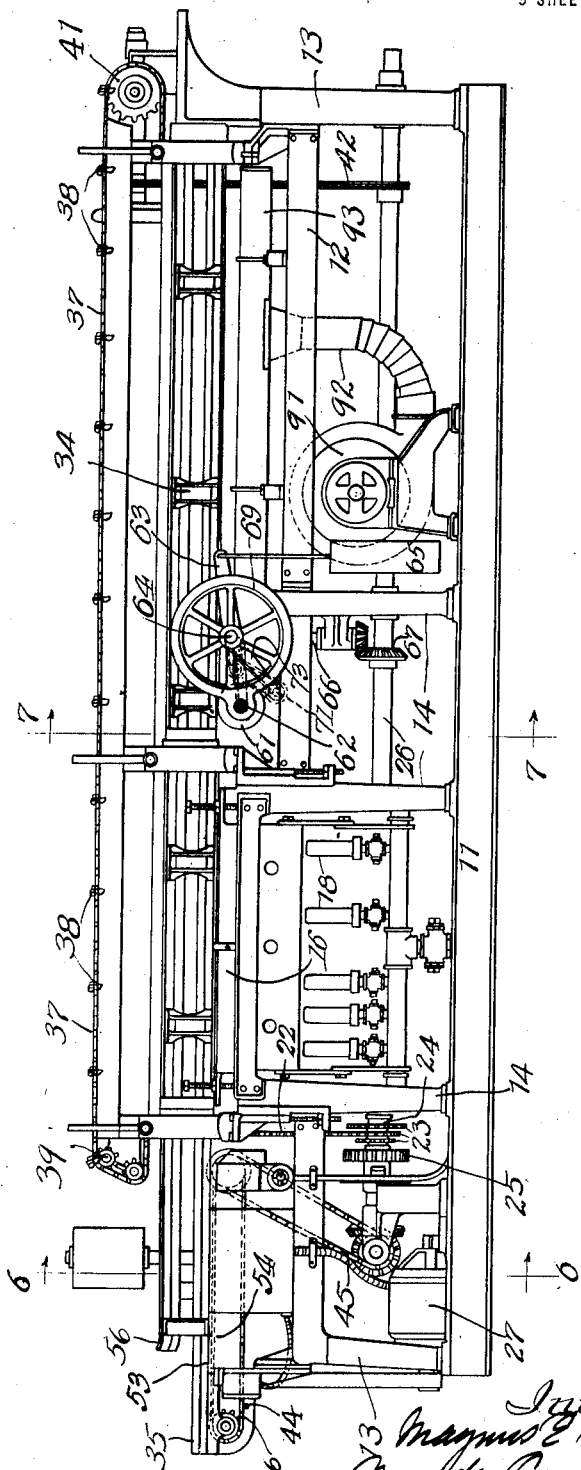

For the purpose of illustrating my invention I have shown on the drawing a soldering machine in which it is embodied and which will now be described in detail. Referring to Fig. 1, reference characters 11 designate a pair of side rails upon which rest the frame generally indicated at 12 of the machine. This frame may have any suitable construction and will not be described in detail. It will, however, be understood that it provides end supports 13 and intermediate supports 14 arranged at appropriate intervals.

The machine is provided with a solder bath 15 in a tank 16 supported at 17 from the frame and located just beneath the path of travel of the cans as will be later described. Suitable heating devices 18 are mounted beneath the tank for maintaining the solder in molten condition. A solder roll 19 journaled at 21 is mounted to rotate in this bath and it will be noted that its longitudinal axis extends lengthwise of the machine. This roll is given a continuous rotation by chain drive 22 engaging any one of the sprocket wheels 23 upon a swinging shaft 24. This shaft carries a gear 25 (Fig. 1) driven from a main power shaft 26 which receives continuous power from a motor 27 through a train of gears 28 (Figs. 4 and 6). The shaft 24 is loosely mounted in arms 29 pivotally mounted at 31 and this for the purpose of permitting the chain drive 22 to engage any desired one of the three gears 23 which, as will be noted, are of different diameter and consequently adapted to drive the solder roll at greater or less velocity as occasion may render desirable. A slot and pin connection 32 are provided for holding the arms in adjusted position.

The cans are caused to move over the bath and along an external horn formed of four bars 33 clamped at intervals at 34 and secured upon the frame. The lowermost bars extend farther to the left of the machine at 35 than do the two uppermost and the protruding ends of the bars thus provided furnish guides on which the can bodies may be slid into the horn. Means are provided which will now be described for continuously feeding the can bodies from one end of the machine to the other, that is, viewing Fig. 1, from the left to the right. This means comprises a conveyer 36 adapted to introduce the bodies into the horn and a conveyer 37 adapted to convey them along the horn and out of the machine at the right. The conveyer 37 is provided with regularly spaced dogs 38 which are adapted to clamp the rear edge of the can bodies (Fig. 2) with sufficient tightness to prevent their turning under the action of the solder roll. The can bodies are thus grasped by the dogs 38 when the chains 36 disengage the plain dogs 44 from said bodies. The conveyer 37 is mounted on suitable sprocket wheels 39 and 41, the latter of which is driven by a chain drive 42 and stub shaft and sprocket wheel connection 43.

Figure 7:
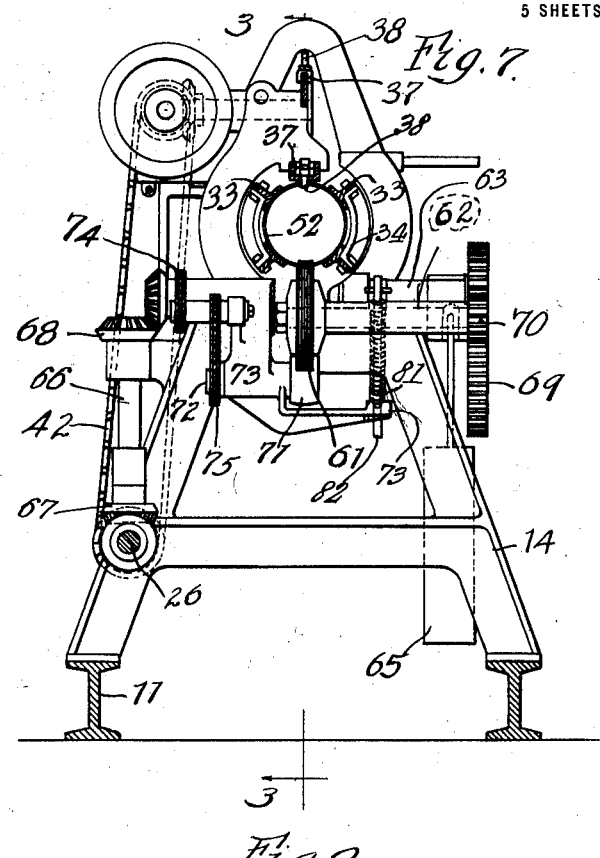
Fig. 7 is a section on the line 7—7 of Fig. 1.

The conveyer 36 consists of two chains having plain dogs 44 arranged at suitable intervals and these chains are driven together and in synchronism with the conveyer 37 by a chain drive 45 which takes over a sprocket shaft 46, which sprocket shaft is driven from a bevel gear connection 47 which also is driven from the main power shaft already mentioned. The conveyer chains 36 are mounted to engage the can on each side and above its lowermost part as it is deposited in the machine. In order that the side seam 51 (Fig. 5) of the can body 52 may be accurately positioned when it enters the machine a block 53 is mounted upon the forward end of a table 54 which forms a support for the chains 36 during their operative travel and which is mounted on the main frame as is indicated in Fig. 5. This block constitutes means for permitting accurate placement of the can body as it enters the machine and has a rib 55 relatively sharp and adapted to enter lightly into the seam. The rib is located beyond the ends 56 of the two uppermost horn rails or parts, which ends are bent to permit easy entrance of the can body. The table 54 is depressed beyond the member or guide 53 to provide a receptacle adapted to contain a fluxing bath 57 (Fig. 2) in which rollers 58 are mounted to apply flux to the side seam. It will be noted that these rollers are mounted with their axes across the machine and do not tend to cause the can to rotate in passing over them. After the cans have passed the fluxing bath they are picked up by conveyer 37 and an appropriate dog 38 grasps the rear end of each can (Figs. 2 and 7) and prevents it turning during the remainder of the travel through the machine. The can bodies are placed successively on the bars at 35 with their side seams 51 engaging on the rib 55, and are successively shoved along, while held from turning by said rib, over and in contact with the fluxing rollers 58, and until they are picked up and carried along the horn by the conveyer clamp-dogs 38.

Figure 8:
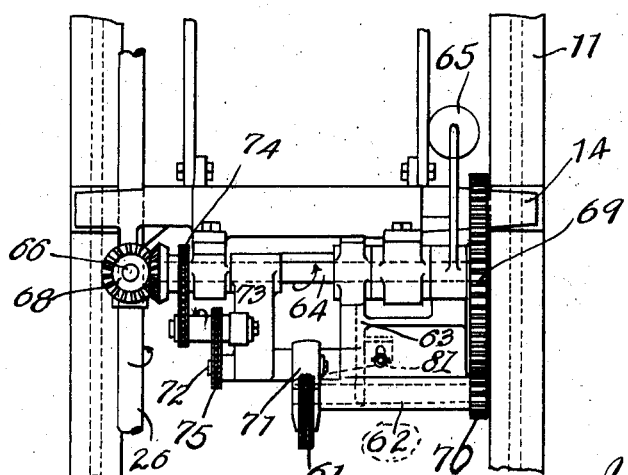
Fig. 8 is a partial top plan view of the wiping mechanism.

After the can passes the solder roll it encounters a wiper which removes any excess solder that may have been deposited. This wiper in the present instance consists of a roll 61 fixed upon a shaft 62 which is mounted in a forward end or arm of a lever 63 (Figs. 3 and 8). This lever is loosely journaled upon a shaft 64 mounted in the frame and a weight 65 pulls down upon its rear arm to hold the roll against the can. The roll is positively driven from the main shaft by a vertical shaft 66 having a bevel gear connection 67 with the main shaft 26 and having also a bevel gear connection 68 (Figs. 7 and 8) with the shaft 64. The shaft 64 carries a gear 69 which meshes with a pinion 70 upon the shaft 62 upon which the wiping roll 61 is fixed.

Means are provided for cleaning the excess solder from the roll 61 and this means consists of a cleaning roll 71 fixed upon a short shaft 72 carried in a swinging frame 73 which frame is pivoted upon the shaft 64 as may be seen from Fig. 8. This cleaning roll is also positively driven through successive chain drives 74 and 75 (Fig. 8),— the drive 74 receiving power from shaft 64 and the drive 75 delivering it to shaft 72. The two rolls are pressed apart by a spring 81 mounted upon a rod 82 which extends through the swinging frame 73 and lever 63 and has adjustable nuts on its ends which nuts and rod hold the rolls in proper relation, the spring serving to steady the action. The wiper roll is thus kept relatively free of surplus solder. The cans after passing the wiping roll travel above a cooling device which consists of a fan 91 (Fig. 3) connected by a conduit 92 with an elongated slotted chamber 93 which delivers the moving air to the can seams causing the solder to harden. After passing the cooling device the cans are delivered out of the machine at the right by passing out of the horn and being freed from the dogs by any suitable mechanism (not shown).

It is thought that the invention and many of its attendant advantages will be understood from the foregoing description, and it will be apparent that various changes may be made in the form, description and arrangement of the parts without departing from the spirit and scope of the invention or sacrificing any of its material advantages, the form hereinbefore described being merely a preferred embodiment thereof.

I claim:

1. In a soldering machine the combination of a horn along which can bodies may be conveyed, a solder applying mechanism disposed adjacent said horn and adapted to apply solder to said bodies as they are conveyed along said horn, means for moving bodies along said horn, a conveyer for feeding bodies to said horn, and means outside of the can bodies with which their side seams are engageable for maintaining said bodies with the seam in accurate position when engaged by said conveyer.

2. In a soldering machine the combination of a horn along which can bodies may be conveyed, a conveyer, solder-applying devices, and fixed means exterior to the can body for accurately positioning the seam of said body when engaged by said conveyer.

3. In a soldering machine the combination of a horn along which can bodies may be conveyed, solder applying devices, and fixed means exterior to the can body for accurately positioning the seam of said body prior to engagement.

4. In a soldering machine the combination of a horn along which can bodies may be moved, a conveyer for feeding can bodies to said horn, and fixed means exterior to the can body engaging the seam of a can for accurately positioning the can prior to engagement.

5. In a soldering machine the combination of a horn along which can bodies may be moved, solder applying devices, a conveyer for receiving the can bodies and for moving them a substantial distance along said horn, and fixed means exterior to the can bodies for engaging the seams of said bodies to accurately position them before engagement with the horn.

6. In a soldering machine the combination of a horn adapted to receive previously formed can bodies, soldering devices adjacent said horn, an exterior seam guide in front of said horn, and means for moving can bodies out of engagement with said seam guide and along said horn.

7. In a soldering machine the combination of a horn along which can bodies may be conveyed for soldering, a solder bath therebeneath, a solder roll mounted in said bath with its axis disposed in parallelism with the axis of said horn, means for moving can bodies along said horn and preventing rotation of said bodies under the action of said solder roll, means for feeding previously formed cans on to said horn, and fixed means exterior to the can body for engaging in the seam of the body before engagement of said body with the horn.

8. In a soldering machine the combination of a horn along which can bodies may be moved for soldering, a solder bath beneath said horn, a solder applying roller in said bath and having its axis disposed in parallelism with the axis of said horn, a conveyer for moving can bodies along said horn and provided with means for preventing turning of the can bodies while moved by said conveyer, and a seam guide arranged in advance of said conveyer for permitting the accurate placement of the seam before engagement of said bodies by said conveyer.

9. In a soldering machine the combination of a horn along which can bodies may be moved for soldering, a solder bath and solder roll mounted in said bath and movable about an axis parallel with the axis of said horn, a conveyer for moving can bodies along said horn, said conveyer being provided with clamps for clamping can bodies against rotation under the action of said solder roll, and a guide arranged in advance of said conveyer for permitting accurate placement of the seam of a can body before it is engaged by said clamps.

10. In a soldering machine, the combination of a horn, means for conveying side-seamed can bodies along said horn, means for applying solder to said can bodies, and a fixed guide exterior to the horn and in advance thereof and of the solder applying means and adapted to engage the formed unsoldered seam of said can bodies.

11. In a soldering machine, a combination of a horn, a conveyer having means for gripping the side-seamed can bodies and holding them from rotation and conveying them along said horn, means for applying solder to said can bodies, and means holding the can bodies from turning before they come within the sphere of action of said gripping means and of the solder applying means, and holding the said can bodies with their seams in proper line for the subsequent action of said solder applying means, and means for propelling the can bodies while so guided and delivering them to be engaged by the grippers of the said conveyer.

12. In a soldering machine, a combination of a horn, a conveyer having means for gripping the side-seamed can bodies and holding them from rotation and conveying them along said horn, means for applying solder to said can bodies, and a fixed guide exterior to the horn and in advance thereof adapted to engage the formed seam of said can bodies before the application of solder thereto and holding the said can bodies with their seams in proper line for the subsequent action of said solder applying means, and means for propelling the can bodies while so guided and delivering them to be engaged by the grippers of the said conveyer.

Signed in the presence of two subscribing witnesses.

MAGNUS E. WIDELL.

Witnesses:
 I. D. MARSH,
 FRED LANZ.